United States Patent
Chung et al.

(10) Patent No.: US 7,958,817 B2
(45) Date of Patent: Jun. 14, 2011

(54) FOOD HEATING DEVICE

(75) Inventors: Terry Tae-Il Chung, Bartlett, IL (US);
Loren Veltrop, Chicago, IL (US); Brian Hee-Eun Lee, West Chicago, IL (US); Donald Van Erden, Wildwood, IL (US); Christopher B. Lyons, Lagrange Park, IL (US)

(73) Assignee: Prince Castle LLC, Carol Stream, IL (US)

( * ) Notice: Subject to any disclaimer, the term of this patent is extended or adjusted under 35 U.S.C. 154(b) by 325 days.

(21) Appl. No.: 12/329,358

(22) Filed: Dec. 5, 2008

(65) Prior Publication Data
US 2010/0143559 A1   Jun. 10, 2010

(51) Int. Cl.
*A21B 5/02* (2006.01)
*A47J 37/08* (2006.01)
*B30B 9/02* (2006.01)

(52) U.S. Cl. ............. 99/373; 99/385; 99/386; 99/389; 99/390; 99/391; 99/393; 99/399; 99/401; 426/466; 100/130

(58) Field of Classification Search ............ 99/373, 99/386, 385, 389, 390, 391, 393, 399, 401; 100/130; 426/466; 219/388, 400, 411
See application file for complete search history.

(56) References Cited

U.S. PATENT DOCUMENTS

| | | | | |
|---|---|---|---|---|
| 1,617,559 | A | * | 2/1927 | Wolcott .................... 99/398 |
| 1,624,017 | A | * | 4/1927 | Shields ..................... 99/395 |
| 4,286,509 | A | | 9/1981 | Miller et al. |
| 4,530,276 | A | | 7/1985 | Miller |
| 4,586,430 | A | * | 5/1986 | Tichy et al. .............. 100/118 |
| 5,960,704 | A | | 10/1999 | March et al. |
| 6,192,789 | B1 | | 2/2001 | Agcaoili et al. |
| 7,297,903 | B1 | | 11/2007 | March et al. |
| 2005/0155495 | A1 | * | 7/2005 | Nevarez .................... 99/385 |

OTHER PUBLICATIONS

Club Toaster Model CTX-200L Manual, A.J. Antunes & Co., P/N 1010993, Rev. D Jun. 2009, © McDonald's Corporation.

\* cited by examiner

*Primary Examiner* — Sang Y Paik
*Assistant Examiner* — Brett Spurlock
(74) *Attorney, Agent, or Firm* — Joseph P. Krause; Kelly & Krause, L.P.

(57) ABSTRACT

One embodiment of a food heating device includes a platen (101) and an opening (103) disposed in the platen (101). The opening (103) is arranged and sized to receive a food product (203) from a first side of the platen (101) and to output the food product (203) to a second side of the platen (101). Alternative embodiments involve diagonally guiding a food product (203) along a different arrangements of platens (801, 901, 1001, 1101, 1401).

25 Claims, 2 Drawing Sheets

FOOD HEATING DEVICE

FIELD OF THE INVENTION

This invention relates to apparatus utilized in food preparation. Such apparatus include, but not limited to, apparatus utilized in the heating of food products such as bread-type food products, including buns, rolls, croissants, bagels, muffins, and the like, as well as pasta, vegetables, cakes, pastries, and so forth.

BACKGROUND OF THE INVENTION

Restaurants often heat bread-type food products, referred to hereinafter as bread products, ranging from bread slices to buns, rolls, croissants, bagels, and the like. Such heating may include warming, toasting or browning (also known as a Maillard reaction), and steaming.

At times, it may be desired to process different parts of a food product differently, although the food product is desired to be completed or assembled at the same time. For example, a club-type sandwich typically includes a bun with a top, a center, and a bottom. Such a sandwich often requires the center to be toasted on both sides, while the top and bottom need only be toasted on one side.

Accordingly, there is a need for a heating device that can heat multiple parts of a food product so that all components are heated in substantially the same amount of time.

DESCRIPTION OF A PREFERRED EMBODIMENT

Figure 1:
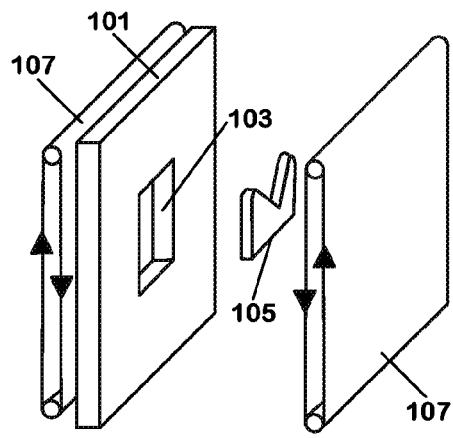
FIG. 1 is a partially exploded perspective view of a heating device having a platen with a guide and an opening in accordance with the invention.

The following describes an apparatus for and method of heating, also known as heat processing, food products, such as bread-type food products, including buns, rolls, croissants, bagels, muffins, flatbread, pitas, and the like, as well as pasta, vegetables, cakes, pastries, and so forth.

Various embodiments of platens are disclosed that heat one and/or both sides of a food product. Several embodiments include multiple platens. Each platen advantageously comprises one or more heating elements. The heating elements are utilized to heat, including, for example, to heat process, warm, toast or brown (also known as a Maillard reaction), steam, grill, defrost, and/or thaw. The platens are typically planar and may be disposed horizontally, vertically, or a combination thereof. The platens shown in the drawings are not necessarily shown proportional to their actual size. The platens are ideally comprised of a material with good heat transfer properties, such as aluminum, steel, ceramic, and/or other thermally conductive materials, and advantageously have a smooth, non-stick surface. The length, width, and temperature of the platen(s) are selected to provide the desired heating when used in conjunction with one or more conveyors, whose speed may also be variable.

A partially exploded perspective view of a heating device 100 having a platen with a guide and an opening is shown in FIG. 1. The food product is received on one side of a platen 101 and directed by a guide 105 into an opening 103 arranged and sized to receive one or more food products. The food product passes through the opening 103 and is received on the second side of the platen 101. In this way, a first side of the food product is heated along the first side of the platen 101 and a second side of the food product is heated along the second side of the platen 101. The guide 105 may be disposed on the platen 101 or one of the conveyors 107, or the guide 105 may be disposed on a stand (not shown) between the platen 101 and a conveyor 107.

A conveyor 107 is disposed on each side of the platen 101. Each conveyor 107 advantageously transports one or more food products in the same direction, e.g., vertically downward, along each side of the platen 101 by use of a belt that keeps the platen 101 in contact with the food product as it slides along the platen 101. The food product is static relative to the belt of the conveyor 107, which is dynamic relative to the platen 101. As a result, the heat transfer rate is higher and food sticking is reduced. A food product that travels via a first conveyor 107 along one side of the platen 101 and through the opening 103 is output to the other side of the platen 101 where the second conveyor 107 transports the food product until it reaches the end (or bottom as shown) of the conveyor 107. The conveyors 107 may be conventional conveyors including rollers and wire or silicone belts intended for use in the food industry. The conveyors herein may be components of a single conveyor system, having a single shared conveyor belt among multiple conveyors, or each conveyor may be separate, where each conveyor has its own conveyor belt. The claims and claim limitations should be construed accordingly. Brackets, stands, and electrical connections for the conveyors and platen (not shown) are known in the art.

Figure 2:
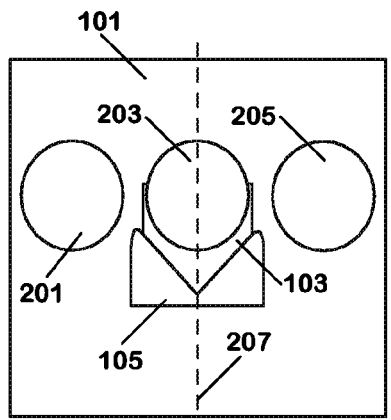
FIG. 2 is a front view of the platen with a guide and an opening in accordance with the invention.

A front view of the platen 101 with a guide 105 and an opening 103 is shown in FIG. 2. A lower part of the guide 105 is disposed near the opening 103. Advantageously, the guide 105 is substantially centered near the opening 103 to optimize direction of the food product into the opening 103. The food product is shown in FIG. 2 in the example of a 3-part bun for a round club-type sandwich, including a top 201, a center 203, and a bottom 205, so named for the sake of reference, but not necessarily orientation. With this example, which will be utilized throughout the drawings, the center 203 is desired to be toasted on both sides, whereas the top 201 and 205 are toasted on one side. By use of this platen 101, one side of the center 203 is toasted by one side of the platen 101 and the other side of the center 203 is toasted by the other side of the platen 103 after the center 203 passes through the opening 103. The top 201, center 203, and bottom 205 arrive at the end of the platen 101 substantially at the same time. If more toasting is desired on the center 203, the part of the platen 101 along which the center 203 travels may be kept at a higher temperature, the material of the platen along which the center 203 travels may have a higher heat transfer coefficient or may be thinner, or a different pressure may be applied to the center 203 as it travels along the platen 101.

Food products may be heated on both sides of the platen 101 because one conveyor 107 is disposed near a first side of the platen 101 and another conveyor 107 is disposed near a second side of the platen 101. If the opening 103 and guide 105 are wide enough (not shown) for two food products to fit through at the same time, six food products, such as two sets of 3-part buns, may be simultaneously heated. For example, a first top 201 may be toasted along the first side of the platen 101, while a second top 201 is toasted along the second side of the platen 101 behind the first top 201. Similarly, a first bottom 205 may be toasted along the first side of the platen 101, while a second bottom 205 is toasted along the second side of the platen 101 behind the first bottom 205. Two centers 203 are toasted side-by-side along the middle of the first side of the platen 101 into the opening 103 after which they are directed side-by-side along the middle of the second side of the platen 101.

Figure 3:
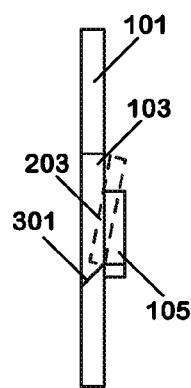
FIG. 3 is a side view of the platen with a guide and an opening in accordance with the invention.

A side view of the platen 101 with a guide 105 and an opening 103 is shown in FIG. 3. A ramped surface 301 extends downward from the first side of the platen 101 to the second side of the platen along at least a part of the opening 103. The ramped surface 301 facilitates the output of the food product 203 through the opening 103. The ramped surface 301 may extend beyond the first side of the opening 103 as part of the guide 105. The ramped surface may, for example, have the shape of an inverted V, the point of which is adjacent the first side of the platen 101. The ramped surface may alternatively have the shape of a conic section having a focus that opens upward and has a focus at or near the center or midpoint of the opening 103.

Figure 4:
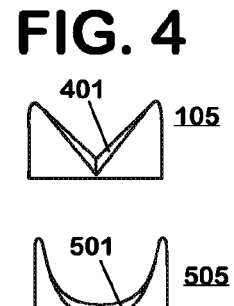
FIG. 4 and FIG. 5 are front views of various guides in accordance with the invention.
Figure 5:
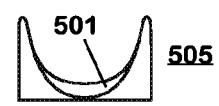

Front views of various guides 105 are shown in FIG. 4 and FIG. 5. The guide 105 may simply be a lip disposed near a lower part of the opening 103 and extending away from one side of the platen 101. The upper surfaces 401 of the guide 105 may be V-shaped, such as shown in FIG. 4. The upper surfaces 501 of the guide 505 may be comprised of curved surfaces, such as shown in FIG. 5. The upper surfaces 401, 501 of the guide 105, 505 are advantageously sloped downward. Advantageously the uppermost parts of the guide 105, 505 are devoid of sharp edges so that the food products are not caught by the guide 105, 505 or otherwise inhibited from travel toward the hole 103.

Figure 6:
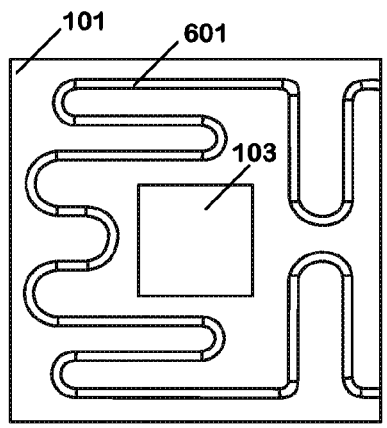
FIG. 6 and FIG. 7 are front views of a platen with an opening and illustrating internal heating elements in accordance with the invention.
Figure 7:
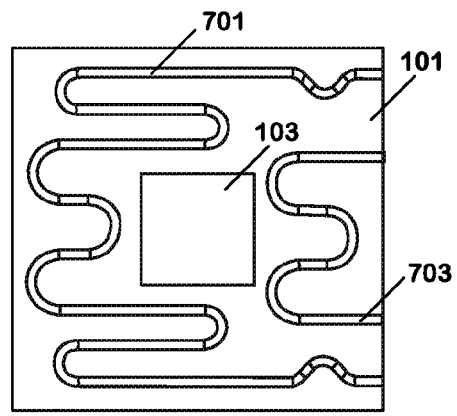

A front view of platen 101 with an opening 103 and illustrating internal heating elements is shown in FIG. 6 and FIG. 7. The platen 101 may include one or more heating elements. An embodiment with a single internal heating element 601 is shown in FIG. 6, and an embodiment with two internal heating elements 701, 703 is shown in FIG. 7. Many other arrangements of heating elements may be successfully utilized other than the examples shown in the drawings, including, for example, more heating elements, different paths of the heating elements, and so forth.

Various embodiments of platens 801, 901, 1001, 1101, 1401 with a diagonal guide 805, 1405 and an opening 103 are shown in FIG. 8 through FIG. 14. In these embodiments, the food product travels diagonally toward the opening 103 on one side of the platen 801, 901, 1001, 1101, 1401 and diagonally away from the opening 103 on the other side of the platen 801, 901, 1001, 1101, 1401. The diagonal paths that direct the food product at an angle with respect to vertical are longer and provide more heating of the food product because it travels over more surface area of the platen 801, 901, 1001, 1101, 1401. Alternatively, other parts of the food product may travel diagonally as well, for example, along additional diagonal guides (not shown).

Figure 8:
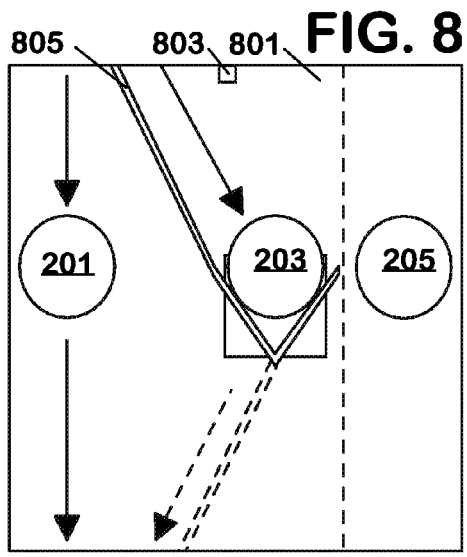
FIG. 8 is a front view of a first alternative platen with a diagonal guide and an opening in accordance with the invention.
Figure 9:
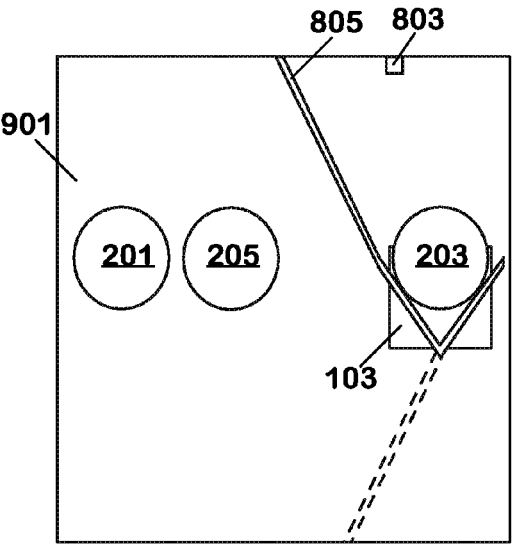
FIG. 9 is a front view of a second alternative platen with a diagonal guide and an opening in accordance with the invention.
Figure 10:
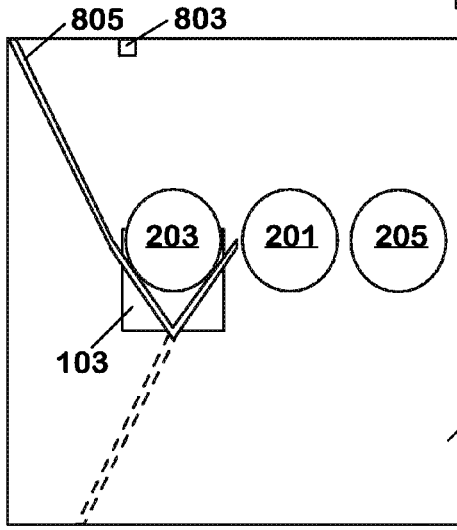
FIG. 10 is a front view of a third alternative platen with a diagonal guide and an opening in accordance with the invention.
Figure 13:
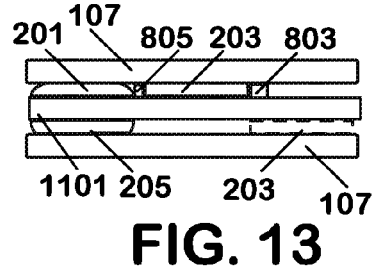
FIG. 13 is a top view of the fourth alternative platen with a diagonal guide and an opening in accordance with the invention.
Figure 11:
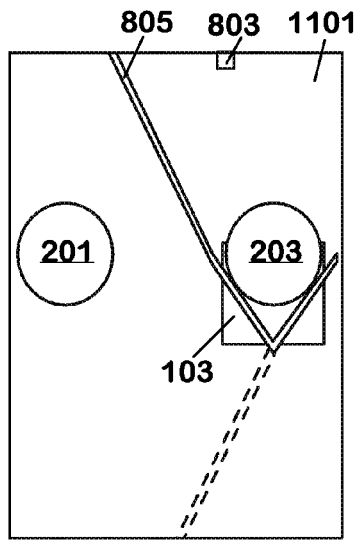
FIG. 11 is a front view of a fourth alternative platen with a diagonal guide and an opening in accordance with the invention.
Figure 12:
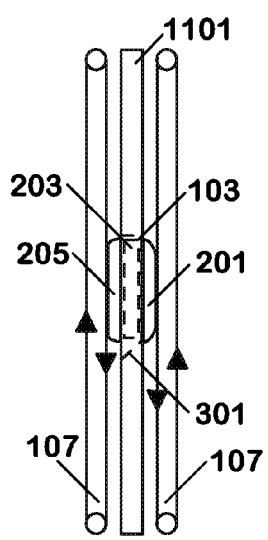
FIG. 12 is a side view of the fourth alternative platen with a diagonal guide and an opening in accordance with the invention.
Figure 14:
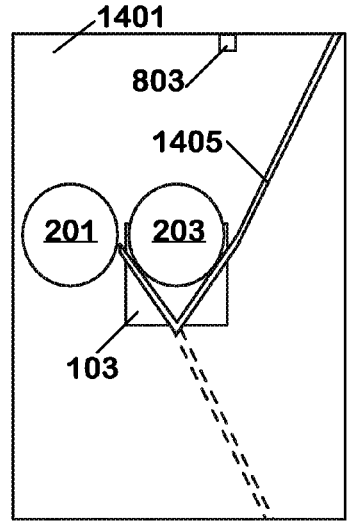
FIG. 14 is a front view of a fifth alternative platen with a diagonal guide and an opening in accordance with the invention.

As shown in FIG. 8, an upper part of the guide 805 is disposed near a topmost part of the platen 801. The guide 805 is comprised of diagonal elongated elements arranged to direct a food product into the opening 103. A block 803 is disposed near the upper part of the guide 805 to provide a slot through which the food product, such as a center 203, is easily directed. The top 201 and bottom 205 travel on either side of the center 203 in FIG. 8, where the center 203 is directed along the middle of the platen 801. The top 201 and bottom 205 travel on one side of the platen 901, 1001 center 203 in FIG. 9 and FIG. 10, whereas the center 203 travels along one side or the other side of the platen 901, 1001 in these embodiments.

Alternative narrower platens are shown in FIG. 11 through FIG. 14. In these examples, the center 203 travels diagonally toward and away from the opening 103 near one edge of the platen 1101, 1401 while the top 201 and bottom 205 travel along the other edge of the platen 1101, 1401, one on each side of the platen, as shown in the side view of FIG. 12 and the top view of FIG. 13. These embodiments also utilize the block 805 and guide 805, 1405 to provide a slot through which the center 203 is directed. Alternatively, additional diagonal guides (not shown) may be provided to direct the top 201 and bottom 205 either above or below the center 203, which guides may be on one or both sides of the platen 801, 901, 1001, 1101, 1401.

The heating device as set forth herein has many advantages, including heating all sides of the food products as required in the same, or nearly the same, time period. Various embodiments minimize the counter space necessary for the heating device. The conveyors may be optimally used to reduce the size of the heating device. By use of a conveyor belt that keeps the platen in contact with the food product, the food product is static relative to the belt of the conveyor, which is dynamic relative to the platen, the heat transfer rate is higher and food sticking is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A food heating device comprising:
  a substantially planar platen having first and second substantially planar opposing sides;
  an opening disposed in the platen, wherein the opening is arranged and sized to receive a food product from the first side of the platen and to output the food product to the second side of the platen; and
  a guide disposed on the first side of the platen and arranged and sized to direct a food product into the opening; wherein the guide is substantially centered near the opening
  the platen is arranged and constructed to toast the food product on a first and then a second opposing side of the food product, the first side of the food product being toasted on the first side of the platen and the second opposing side of the food product being toasted on the second side of the platen which heats the first side of the food product on the first side of the platen and heats the second side of the food product after the food product passes through the opening.

2. The food heating device of claim 1, further comprising a ramped surface extending from the first side of the platen to the second side of the platen and disposed along at least a part of the opening.

3. The food heating device of claim 2, wherein, when the platen is in its operating position, the ramped surface extends downward from the first side of the platen to the second side of the platen.

4. The food heating device of claim 2, wherein the ramped surface extends beyond the first side of the platen.

5. The food heating device of claim 1, wherein an upper part of the guide is disposed near a topmost part of the platen.

6. The food heating device of claim 1, wherein a lower part of the guide is disposed near the opening.

7. The food heating device of claim 1, wherein the guide has a V-shape.

8. The food heating device of claim 1, wherein an upper surface of the guide is devoid of sharp edges.

9. The food heating device of claim 1, wherein an upper surface of the guide is comprised of curved surfaces.

10. The food heating device of claim 5, wherein the guide directs the food product at an angle with respect to vertical toward the opening.

11. The food heating device of claim 5, wherein the guide comprises a lip disposed near a lower part of the opening, wherein the lip extends away from the first side of the platen.

12. The food heating device of claim 1, arranged and constructed to operate with a first conveyor disposed near a first side of the platen and a second conveyor disposed near a second side of the platen.

13. The food heating device of claim 12, further comprising a guide disposed on the first conveyor.

14. The food heating device of claim 12, wherein the food product is static relative to a belt of at least one of the first conveyor and the second conveyor.

15. The food heating device of claim 1, further comprising a guide comprised of at least two elongated elements arranged to direct a food product into the opening.

16. The food heating device of claim 1, further comprising a guide that directs the food product at an angle with respect to vertical.

17. The food heating device of claim 1, wherein the platen further comprises at least one heating element.

18. The food heating device of claim 1, wherein a first side of the food product is heated as it passes along the first side of the platen.

19. The food heating device of claim 1, wherein a second side of the food product is heated as it passes along the second side of the platen.

20. The food heating device of claim 1, wherein the food product comprises a bread product, pasta, a vegetable, a cake, or a pastry.

21. The food heating device of claim 3, wherein the ramped surface is in the shape of an inverted V, the point of which is adjacent the first side of the platen.

22. The food heating device of claim 3, wherein the ramped surface is in the shape of a conic section having a focus located adjacent the first side of the platen.

23. The food heating device of claim 1, wherein the platen is planar and is disposed horizontally.

24. The food heating device of claim 1, wherein the platen is planar and is disposed vertically.

25. The food heating device of claim 1, wherein the food product travels along the platen in a diagonal direction.

* * * * *